United States Patent
Liu et al.

(10) Patent No.: US 11,884,885 B2
(45) Date of Patent: Jan. 30, 2024

(54) CO-PROCESSING OF WASTE PLASTIC PYROLYSIS OILS AND BIORENEWABLE FEEDSTOCKS

(71) Applicant: CHEVRON U.S.A. INC., San Ramon, CA (US)

(72) Inventors: Tengfei Liu, Fairfield, CA (US); Joel Edward Schmidt, Oakland, CA (US); Richard Grove, Spanish Fort, AL (US); Hye-Kyung Cho Timken, Albany, CA (US)

(*) Notice: Subject to any disclaimer, the term of this patent is extended or adjusted under 35 U.S.C. 154(b) by 0 days.

(21) Appl. No.: 17/868,884

(22) Filed: Jul. 20, 2022

(65) Prior Publication Data

US 2023/0085274 A1    Mar. 16, 2023

Related U.S. Application Data

(60) Provisional application No. 63/236,758, filed on Aug. 25, 2021.

(51) Int. Cl.
| | | |
|---|---|---|
| *C10G 3/00* | (2006.01) | |
| *C10G 1/00* | (2006.01) | |
| *C10G 11/18* | (2006.01) | |
| *C10L 1/06* | (2006.01) | |

(52) U.S. Cl.
CPC .............. *C10G 3/60* (2013.01); *C10G 11/187* (2013.01); *C10L 1/06* (2013.01); *C10G 2300/1003* (2013.01); *C10G 2300/1014* (2013.01); *C10G 2300/1059* (2013.01); *C10G 2300/305* (2013.01); *C10G 2300/308* (2013.01); *C10G 2300/4006* (2013.01); *C10G 2300/4012* (2013.01); *C10G 2400/02* (2013.01)

(58) Field of Classification Search
CPC ... C10G 3/42; C10G 3/49; C10G 3/60; C10G 11/18; C10G 11/187; C10G 2300/1003; C10G 2300/1011; C10G 2300/1014; C10G 2300/1059; C10G 2300/305; C10G 2300/308; C10G 2300/4006; C10G 2300/4012; C10G 2400/02; C10G 2400/04; C10G 1/002; C10G 1/10; C10L 1/04; C10L 1/06; Y02P 30/20
See application file for complete search history.

(56) References Cited

U.S. PATENT DOCUMENTS

| | | | | |
|---|---|---|---|---|
| 8,404,911 B2 * | 3/2013 | Srinakruang | ............ | B01J 21/10 585/240 |
| 2008/0035528 A1 | 2/2008 | Marker | | |
| 2013/0178672 A1 * | 7/2013 | Chen | .................... | C10G 11/182 585/324 |
| 2016/0244677 A1 | 8/2016 | Froehle | | |

FOREIGN PATENT DOCUMENTS

WO    2011148261 A2    12/2011

OTHER PUBLICATIONS

Srivastava et al. ("Triglycerides-based diesel fuels." Renewable and sustainable energy reviews 4.2 (2000): 111-133) (Year: 2000).*
Budsaereechai et al. ("Catalytic pyrolysis of plastic waste for the production of liquid fuels for engines." RSC Adv., 2019, 9, 5844-5857) (Year: 2019).*
PCT International Search Report, International Application No. PCT/IB2022/056693, dated Oct. 14, 2022.
S. Papari, H. Bamdad and F. Berruti "Pyrolytic Conversion of Plastic Waste to Value-Added Products and Fuels: A Review" Materials 2021, 14, 2586.
R. Palos, A. Gutierrez, F.J. Vela, M. Olazar, J.M. Arandes and J. Bilbao "Waste Refinery: The Valorization of Waste Plastics and End-of-Life Tires in Refinery Units. A Review" Energy Fuels 2021, 35, 3529-3557.

* cited by examiner

*Primary Examiner* — In Suk C Bullock
*Assistant Examiner* — Jason Y Chong

(57) ABSTRACT

A process is provided for producing a liquid hydrocarbon material suitable for use as a fuel or as a blending component in a fuel. The process includes co-processing a pyrolysis oil derived from a waste plastic raw material and a biorenewable feedstock comprising triglycerides in a catalytic cracking process in a presence of a solid catalyst at catalytic cracking conditions to provide a cracking product. The cracking product may be fractionated to provide at least one of a gasoline fraction and a middle distillate fraction.

14 Claims, No Drawings

CO-PROCESSING OF WASTE PLASTIC PYROLYSIS OILS AND BIORENEWABLE FEEDSTOCKS

CROSS REFERENCE TO RELATED APPLICATIONS

This application claims priority to and the benefit of U.S. Provisional Patent Application No. 63/236,758, filed on Aug. 25, 2021, the disclosure of which is incorporated herein by reference in its entirety.

FIELD

The present disclosure relates a process for producing a liquid hydrocarbon material suitable for use as a fuel or as a blending component in a fuel, where waste plastic pyrolysis oil is co-processed with biorenewable feedstock in a catalytic cracking process.

BACKGROUND

Catalytic cracking processes are commonly used in refineries as a method for converting non-renewable petroleum feedstocks, without requiring additional hydrogen, to produce lower boiling fractions suitable for use as fuels.

With increasing demand for liquid transportation fuels, decreasing reserves of "easy oil" (crude petroleum oil that can be accessed and recovered easily) and increasing constraints on the carbon footprints of such fuels, it is becoming increasingly important to develop routes to produce liquid transportation fuels from alternative sources in an efficient manner.

Due to their availability on a large scale, biomass-based feedstocks, such as lipid feedstocks (e.g., fats and/or oils of plant, animal and/or microbial origin), and waste plastics are important sources of feed with significant potential to address the increasing demand for alternative liquid fuels. Biomass offers a source of renewable carbon. Waste plastics have significant potential to address increasing demands for "circular economy" processes.

Despite the ongoing research and development of processes for the manufacture of liquid fuels, there is still a need to provide an improved process for producing low carbon footprint hydrocarbons useful as liquid fuels or fuel blending components.

SUMMARY

In a first aspect there is provided a process comprising: co-processing a pyrolysis oil derived from a waste plastic raw material and a biorenewable feedstock comprising triglycerides in a catalytic cracking process in a presence of a solid catalyst at catalytic cracking conditions to provide a cracking product.

In a second aspect, there is provided a fuel component obtainable by the above-described process.

In a third aspect, there is provided a method of producing a fuel comprising producing a cracking product as defined above, optionally fractionating the cracking product to provide a cracking product fraction, and blending the cracking product or the cracking product fraction with another fuel component to provide a fuel.

DETAILED DESCRIPTION

Definitions

The term "post-consumer" refers to a source of material that originates after the end consumer has used the material in a consumer good or product.

The term "post-industrial" refers to a source of a material that originates during the manufacture of a good or product.

The term "polyethylene" refers to polymers comprising a majority amount (>50 mol %) of units which have been derived from ethylene monomer.

The term "polypropylene" refers to polymers comprising a majority amount (>50 mol %) of units which have been derived from propylene monomer.

The term "Cn hydrocarbons" or "Cn", is used herein having its well-known meaning, that is, wherein "n" is an integer value, and means hydrocarbons having that value of carbon atoms. The term "Cn+ hydrocarbons" or "Cn+" refers to hydrocarbons having that value or more carbon atoms. The term "Cn– hydrocarbons" or "Cn–" refers to hydrocarbons having that value or less carbon atoms.

The term "LPG" means liquid petroleum gas in the form of a mixture comprising predominantly propane and butane (i.e., at least 95 vol. % propane and butane), with C2– compounds not exceeding 2 vol. %, C5+ compounds not exceeding 3 vol. %, in which C2– compounds are alkanes or alkenes having 2 or less carbon atoms, and C5+ compounds are alkanes or alkenes having 5 or more carbon atoms.

The term "gasoline" is used to describe a hydrocarbon stream collected within a cut point range of about 95° F. (35° C.) to about 427° F. (220° C.). Gasoline boiling range hydrocarbons comprise predominantly C5 to C12 hydrocarbons.

The term "middle distillate" is used to describe a hydrocarbon stream collected within a cut point range of about 427° F. (220° C.) to about 650° F. (343° C.). Middle distillate boiling range hydrocarbons comprise predominantly C11 to C20 hydrocarbons.

The term "octane number" refers to the percentage of iso-octane in a mixture of iso-octane and n-heptane that would have the same knock resistance as the presently tested fuel, according to ASTM D2699 and D2700. Octane numbers typically range from 0 to 100, with higher values indicating better fuel performance. Octane numbers are unitless.

The term "Research Octane Number" (RON) refers to the octane number obtained by testing at lower engine speed and temperature, typically about 600 rpm, according to ASTM D2699.

The term "Motor Octane Number" (MON) refers to the octane number obtained by testing at higher engine speed and temperature, typically about 900 rpm according to ASTM D2700. Given that engine inefficiency inherently increases as temperature increases, RON is typically higher than MON.

The term "anti-knock index" is defined by the arithmetic average of the two octane numbers: (RON+MON)/2.

The terms "wt. %" or "vol. %" refers to a weight or volume percentage of a component, respectively, based on the total weight or the total volume of material, including the component. In a non-limiting example, 10 grams of component in 100 total grams of the material, including the 10 grams of component, is 10 wt. % of component.

Pyrolysis Oil

The pyrolysis oil is made by pyrolyzing (i.e., thermally decomposing organic matter in the absence of oxygen) a waste plastic raw material, either catalytically or non-catalytically and via a continuous or a batch process. The pyrolysis of waste plastic is well known in the art.

After pyrolysis of the waste plastics raw material, the pyrolysis products may contain gas, solids (char), one or more oily phase(s), and an aqueous phase. The oily phase(s), optionally including water, may be employed as the pyrolysis oil in the present disclosure. The pyrolysis oil can be separated from the pyrolysis products by any known method. This includes methods such as filtration, centrifugation, cyclone separation, extraction, membrane separation and/or phase separation.

The waste plastic raw material that is pyrolyzed may be a post-consumer use polymer, a post-industrial use polymer, or a combination thereof. An example of post-industrial waste polymers can be waste polymers produced during the manufacture or shipment of a good or product that are collected as unusable material by the manufacturer (i.e., trim scraps, out of specification material, start-up scrap).

The waste plastic raw material that is pyrolyzed may be a single type of waste plastic or may be comprised of a combination of two or more types of waste plastic.

Plastics materials are categorized and labeled by manufacturers of plastics materials to help improve sorting of plastics materials. At present, plastics materials are separated into seven categories established by the Society of the Plastics Industry (SPI) with each category having its own resin identification code. Each number represents a particular type of plastic, and typically can only be recycled with plastics having the same number. Plastics materials include the polymer polyethylene terephthalate (PET or PETE) having a number 1 resin identification code, the polymer high-density polyethylene (HDPE) having a number 2 resin identification code, the polymer polyvinyl chloride (PVC) having a number 3 resin identification code, the polymer low-density polyethylene (LDPE) having a number 4 resin identification code, the polymer polypropylene (PP) having a number 5 resin identification code, the polymer polystyrene (PS) having a number 6 resin identification code, and other miscellaneous plastics (i.e., those not described with codes 1-6) having a number 7 resin identification code such as multi-layered plastic, mixed plastic, and other resins such as polycarbonate (PC) and acrylonitrile-butadiene-styrene (ABS).

The waste plastic raw material that is pyrolyzed may be selected from HDPE, LDPE, polypropylene, and combinations thereof.

HDPEs are ethylene-based polymers generally having densities greater than 0.940 g/cm$^3$ (e.g., 0.945 to 0.97 g/cm$^3$). Polymer densities provided herein are determined according to ASTM D792.

LDPE consists of ethylene homopolymer, or ethylene/α-olefin copolymer comprising at least one C3 to C10 α-olefin (e.g., C3 to C4 α-olefin) that has a density from 0.915 g/cm$^3$ to 0.940 g/cm$^3$ and contains long-chain branching with broad MWD. LDPE includes linear low-density polyethylene (LLDPE). LLDPE is a linear ethylene/α-olefin copolymer containing heterogeneous short-chain branching distribution comprising units derived from ethylene and units derived from at least one C3 to C10 α-olefin comonomer or at least one C4 to C8 α-olefin comonomer, or at least one C6 to C8 α-olefin comonomer. LLDPE is characterized by little, if any, long chain branching, in contrast to conventional LDPE.

Polypropylene may be a polypropylene homopolymer or a primarily polypropylene copolymer.

Other plastics (Resin Identification Code Numbers 1, 3, 6, and/or 7), such as polyethylene terephthalate, polyvinyl chloride, polystyrene, and polycarbonate, are less desirable in the waste plastic raw material to be pyrolyzed. If present, they are preferably present in an amount of less than 5% by weight (e.g., less than 1% by weight, or less than 0.5% by weight, or less than 0.1% by weight) of the total weight of the dry waste plastic. Preferably, the individual content of any less desirable plastic is less than 1% by weight (e.g., less than 0.5% by weight, or less than 0.1% by weight) based on the total weight of the dry waste plastic raw material.

The pyrolysis oil may predominantly comprise C4 to C30 hydrocarbons. The pyrolysis oil may have a C4 to C30 hydrocarbon content of at least 55 wt. % (e.g., at least 60 wt. %, or at least 65 wt. %, or at least 70 wt. %, or at least 75 wt. %, or at least 80 wt. %, or at least 85 wt. %, or at least 90 wt. %, or at least 95 wt. %), based on the weight of the pyrolysis oil.

The pyrolysis oil can predominantly comprise C5 to C25, C5 to C22, or C5 to C20 hydrocarbons, or may comprise at least about 55 wt. % (e.g., at least 60 wt. %, or at least 65 wt. %, or at least 70 wt. %, or at least 75 wt. %, or at least 80 wt. %, or at least 85 wt. %, or at least 90 wt. %, or at least 95 wt. %) of C5 to C25, C5 to C22, or C5 to C20 hydrocarbons, based on the weight of the pyrolysis oil.

The pyrolysis oil may contain paraffins (n-paraffins, isoparaffins, or both), naphthenes, olefins, aromatics, and other compounds.

The pyrolysis oil may have a paraffins content of at least 20 wt. % (e.g., 25 wt. %, or at least 30 wt. %, or at least 35 wt. %, or at least 40 wt. %, or at least 45 wt. %, or at least 50 wt. %). Additionally or alternatively, the pyrolysis oil may have a paraffins content of not more than 90 wt. % (e.g., not more than 85 wt. %, or not more than 80 wt. %, or not more than 75 wt. %, or not more than 70 wt. %, or not more than 65 wt. %, or not more than 60 wt. %, or not more than 55 wt. %). In some aspects, the pyrolysis oil may have a paraffins content in a range of from 20 to 90 wt. % (e.g., 25 to 90 wt. %, or 25 to 55 wt. %, or 30 to 90 wt. %, or 40 to 80 wt. %, or 40 to 70 wt. %, or 40 to 65 wt. %).

The pyrolysis oil may have an n-paraffins to isoparaffins weight ratio of at least 0.001:1 (e.g., at least 0.1:1, or at least 0.2:1, or at least 0.5:1, or at least 1:1, or at least 2:1, or at least 3:1, or at least 4:1, or at least 5:1, or at least 6:1, or at least 7:1, or at least 8:1, or at least 9:1, or at least 10:1, or at least 15:1, or at least 20:1). Additionally or alternatively, the pyrolysis oil may have an n-paraffins to isoparaffins weight ratio of not more than 100:1 (e.g., not more than 75:1, or not more than 50:1, or not more than 40:1, or not more than 30:1). In some aspects, the pyrolysis oil may have an n-paraffins to isoparaffins weight ratio in a range of from 0.1:1 to 100:1 (e.g., 1:1 to 100:1, or 4:1 to 100:1, or 15:1 to 100:1).

The pyrolysis oil may have a naphthenes content of at least 1 wt. % (e.g., at least 2 wt. %, or at least 3 wt. %, or at least 4 wt. %, or at least 5 wt. %, or at least 6 wt. %, or at least 7 wt. %, or at least 8 wt. %, or at least 9 wt. %, or at least 10 wt. %, or at least 11 wt. %, or at least 12 wt. %, or at least 13 wt. %, or at least 14 wt. %, or at least 15 wt. %). Additionally or alternatively, the pyrolysis oil may have a naphthenes content of not more than 50 wt. % (e.g., not more than 45 wt. %, or not more than 40 wt. %, or not more than 35 wt. %, or not more than 30 wt. %, or not more than 25 wt. %, or not more than 20 wt. %) naphthenes. In some aspects, the pyrolysis oil may have a naphthenes content in a range of from 2 to 50 wt. %.

The pyrolysis oil may contain at least 1 wt. % (e.g., at least 2 wt. %, or at least 5 wt. %, or at least 10 wt. %, or at least 15 wt. %, or at least 20 wt. %) olefins. Additionally or alternatively, the pyrolysis oil may include not more than 60 wt. % (e.g., not more than 55 wt. %, or not more than 50 wt. %, or not more than 45 wt. %, or not more than 40 wt. %, or not more than 35 wt. %, or not more than 30 wt. %, or not more than 25 wt. %, or not more than 20 wt. %, or not more than 15 wt. %, or not more than 10 wt. %, or not more than 5 wt. %, or not more than 2 wt. %, or not more than 1 wt. %) olefins. In some aspects, the pyrolysis oil may have an olefins content in a range of from 2 to 60 wt. % (e.g., 10 to 40 wt. %). The pyrolysis oil may be hydrogenated at a production facility to lower the olefin content.

The pyrolysis oil may contain at least 1 wt. % (e.g., at least 2 wt. %, or at least 3 wt. %, or at least 4 wt. %, or at least 5 wt. %) aromatics. Additionally or alternatively, the pyrolysis oil may include not more than 50 wt. % (e.g., not more than 45 wt. %, or not more than 40 wt. %, or not more than 35 wt. %, or not more than 30 wt. %) aromatics. In some aspects, the pyrolysis oil may have an aromatics content in a range of from 2 to 50 wt. % (e.g., 5 to 30 wt. %).

In some aspects, equal to or greater than about 10 wt. %, alternatively 25 wt. %, or alternatively 50 wt. % of the as-produced pyrolysis oil is characterized by a boiling point of less than 370° C. In other aspects, equal to or greater than about 90 wt. %, alternatively 95 wt. %, or alternatively 99 wt. % of the pyrolysis oil is characterized by a boiling point of less than 650° C.

The content of paraffins, naphthenes, olefins and aromatics can vary widely depending on pyrolysis unit severity. At more severe conditions (e.g., high temperature and longer residence time), the content of aromatics and olefins increases relative to the content of paraffins and naphthenes.

It is noted that all of the above-referenced hydrocarbon weight percentages may be determined using gas chromatography-mass spectrometry (GC-MS).

The pyrolysis oil may exhibit an API gravity at 15° C. of at least 28 (e.g., at least 29, or at least 30, or at least 31, or at least 32, or at least 33). Additionally, or alternatively, the pyrolysis oil may exhibit an API gravity at 15° C. of not more than 50 (e.g., not more than 49, or not more than 48, or not more than 47, or not more than 46, or not more than 45, or not more than 44). In some aspects, the pyrolysis oil exhibits an API gravity at 15° C. of in a range of from 28 to 50 (e.g., 29 to 48, or 30 to 45).

The pyrolysis oil may exhibit a density at 15° C. of at least 0.6 g/cm$^3$ (e.g., at least 0.65 g/cm$^3$, or at least 0.7 g/cm$^3$). Additionally, or alternatively, the pyrolysis oil may exhibit a density at 15° C. of not more than 1 g/cm$^3$ (e.g., not more than 0.95 g/cm$^3$, or not more than 0.9 g/cm$^3$, or not more than 0.85 g/cm$^3$). In some aspects, the pyrolysis oil exhibits a density at 15° C. in a range of from of 0.6 to 1 g/cm$^3$ (e.g., 0.65 to 0.95 g/cm$^3$, or 0.7 to 0.9 g/cm$^3$).

The pyrolysis oil may be subjected to one or more treatment steps prior to being introduced into downstream units, such as a cracking zone. Examples of suitable treatment steps can include, but are not limited to, separation of less desirable components (e.g., nitrogen-containing compounds, oxygenates, and/or olefins and aromatics), distillation to provide specific pyrolysis oil compositions, and preheating. In some aspects, the pyrolysis oil is not pretreated at all before any downstream applications and may be sent directly from the pyrolysis oil source.

Biorenewable Feedstock

The biorenewable feedstock comprising triglycerides originates from a biological source or sources rather than a fossil oil based source such as crude oil (mineral oil) or shale oil or coal.

The renewable feedstock may include any of those feedstocks which comprise triglycerides. The renewable feedstock may be a plant oil, an animal oil, an algae oil, or any combination thereof. Representative examples of renewable feedstocks include camelina oil, canola oil, corn oil, soy oil, rapeseed oil, soybean oil, colza oil, tall oil, sunflower oil, hempseed oil, olive oil, linseed oil, coconut oil, castor oil, peanut oil, palm oil, mustard oil, yellow and brown greases, tallow, lard, fish oil, algae oil, sewage sludge, and the like.

Besides triglycerides, the renewable feedstock typically contains other lipid component such as diglycerides, monoglycerides, free fatty acids (FFAs), etc. The renewable feedstock preferably contains at least 75 wt. % (e.g., at least 80 wt. %, at least 85 wt. %, at least 90 wt. %, 80 to 99.9 wt. %, or 90 to 99.5 wt. %) triglycerides. The glycerides and FFAs of the typical plant or animal oil contain aliphatic hydrocarbon chains in their structure which have about 8 to about 30 carbon atoms. The aliphatic carbon chains in glycerides or FFAs can be fully saturated, or mono-, di- or poly-unsaturated.

The renewable feedstock may contain varying amounts of impurities, such as metals, water, phosphorus, silicon, alkali metals, earth alkaline metals, etc.

The renewable feedstock may be pretreated to remove impurities and filtered to remove solids.

Catalytic Cracking

Catalytic cracking involves contacting at least one hydrocarbonaceous feedstream with a cracking catalyst under catalytic cracking conditions to produce a cracking product. In the present disclosure, the cracking product is anything (liquid, solid, volatile) that leaves the reactor, except for the catalyst. Examples of cracked products from the catalytic cracking process described herein include one or more of hydrogen, light olefins (less than 5 carbon atoms), light paraffins, olefins and paraffins having more than five or more carbon atoms, and coke.

The catalytic cracking reaction may be carried out in a fixed-bed reactor, a moving-bed reactor, or a fluidized-bed reactor, and preferably with a fluidized-bed reactor. The fluidized-bed reactor may be configured to include a selection from the list consisting of a riser, a downer, multiple risers, and multiple downers, and combinations thereof.

The process of the present disclosure is preferably carried out as a continuous process. Using a continuous process provides the advantage that there is no need to change reaction conditions. As a result, easy handling and very good results can be achieved.

In some aspects, the catalytic cracking process is a fluid catalytic cracking (FCC) process. Use of FCC processes allows easy handling and high throughput which results in an advantageous particularly high yield.

When the catalytic cracking is conducted in one or more of a fixed-bed reactor, a moving-bed reactor, and a fluidized-bed reactor, cracking conditions can include a temperature of from 400° C. to 600° C. and a pressure of from 40 kPa to 725 kPa. The temperature may be 420° C. or more, such as 440° C. or more, such as 450° C. or more, such as 460° C. or more, such as 470° C. or more, with an upper limit of 570° C. or less, such as 550° C. or less, such as 540° C. or less, such as 530° C. or less, such as 525° C. or less, such as 520° C. or less. The pressure can be from a low of 40 kPa, such as 55 kPa, such as 65 kPa, such as 70 kPa to a high of 650 kPa, such as 675 kPa, such as 700 kPa, such as 725 kPa.

When catalytic cracking is conducted in a fluidized-bed reactor, the reaction conditions can include a weight hourly space velocity (WHSV) in a range of from 0.5 $h^{-1}$ to 50 $h^{-1}$ (e.g., 1 $h^{-1}$ to 40 $h^{-1}$, or 2 $h^{-1}$ to 20 $h^{-1}$). The residence time in the fluidized-bed reactor may be in a range of from 100 milliseconds to 10 seconds (e.g., 1 second to 5 seconds, or 2 seconds to 4 seconds).

The weight ratio of catalyst to the total amount of the combined feed (e.g., pyrolysis oil and biorenewable feedstock) introduced into a catalytic cracking zone that contacts the catalyst in the catalytic cracking zone (sometimes referred to as a "catalyst-to-oil ratio" or "catalyst:oil ratio") may be in a range of from 2:1 to 10:1 (e.g., 3:1 to 9:1, or 4:1 to 8:1, or 5:1 to 7:1).

Catalysts suitable for use herein can be cracking catalysts comprising either a large-pore size molecular sieve or a mixture of at least one large-pore size molecular sieve catalyst and at least one medium-pore size molecular sieve catalyst. Suitable large-pore molecular sieves include zeolite beta, ZSM-10, and the faujasites, particularly zeolite Y, ultrastable Y (USY), rare earth-exchanged Y (REY), and rare earth-exchanged ultrastable Y (REUSY). Examples of suitable medium-pore molecular sieves include ZSM-5, ZSM-11, ZSM-22, ZSM-48 and MCM-22. The cracking catalyst may be mixed with a binder, and shaped to a desired shape (e.g., extruded pellets). Suitable binders include silica, silica-alumina, alumina, clays or other known inorganic binders. A combination catalyst can comprise two or more molecular sieves mixed into a common catalyst pellet or can comprise a mixture of catalyst pellets of different types of catalytic materials.

In the process of the present disclosure, the ratio of the pyrolysis oil to the biorenewable feedstock (pyrolysis oil: biorenewable feedstock) may be in a range of from 5:1 to 1:19 by weight. The ratio of the pyrolysis oil to the biorenewable feedstock is defined as parts of pyrolysis oil in relation to parts of biorenewable feedstock. In other words, a ratio of the pyrolysis oil to the biorenewable feedstock (pyrolysis oil:renewable feedstock) 1:19 by weight means a mixture containing 1 wt.-part pyrolysis oil and 19 wt.-parts biorenewable feedstock (5 wt. % of pyrolysis oil and 95 wt. % of biorenewable feedstock provided that the sum of pyrolysis oil and biorenewable feedstock is 100 wt. %, i.e., in case of a mixture consisting of pyrolysis oil and biorenewable feedstock). The ratio of pyrolysis oil:biorenewable feedstock may be 4:1 by weight or lower, or 2:1 by weight or lower, or 1:1 by weight. Further, the ratio may be 1:7 by weight or higher, or 1:10 by weight or higher, or 1:7 by weight or higher, or 1:5 by weight or higher, or 1:4 by weight or higher, or 1:3 by weight or higher.

The pyrolysis oil and the biorenewable feedstock may be introduced into a reactor, in which the catalytic cracking process is carried out, using different feeding lines. When adding the pyrolysis oil and the biorenewable feedstock using different feed lines, it may be easier to achieve good temperature control. In a continuous process, the energy required for cracking is usually provided by heated catalyst. Thus, the temperature is highest near the inlet of the catalyst. In case a feed is easily degraded by excessively high temperatures, injecting this feed at a later position (more remote from the catalyst inlet) can reduce coking.

The pyrolysis oil and the biorenewable feedstock may be introduced into a reactor, in which the catalytic cracking process is carried out, using the same feeding line. Such a procedure facilitates feeding. It is also possible to combine these approaches, i.e., feed a mixture of pyrolysis oil and the biorenewable feedstock using one single feeding line and in addition feeding one or both of the pyrolysis oil and the biorenewable feedstock using additional (separate) feeding line(s).

A fossil-based fraction may further be introduced into the cracking reactor, in which the catalytic cracking process is carried out. In this case, the fossil-based fraction is co-processed with the pyrolysis oil and the biorenewable feedstock.

The fossil-based fraction and the pyrolysis oil may be introduced into a reactor, in which the catalytic cracking process is carried out, using different feeding lines and/or using the same feeding line. Similarly, the fossil-based fraction and the biorenewable feedstock can be introduced into the cracking reactor using different feeding lines and/or using the same feeding line. An appropriate way of feeding the respective fractions depends on the actual processing conditions and the required temperature control. Further, the fossil-based fraction may be mixed with the biorenewable feedstock, with the pyrolysis oil, or with the biorenewable feedstock and the pyrolysis oil in advance.

The fossil-based feed may be any conventional fossil feed usually employed in fuel refining (e.g., in catalytic cracking). Preferably, the fossil-based feed is a hydrocarbon feed. The fossil-based fraction feed may be a gas oil (GO) feed, a vacuum gas oil (VGO) feed, a Fischer-Tropsch wax, or any combination thereof.

The process of the present disclosure may further comprise a step of fractionating the catalytic cracking product to provide at least a gasoline fraction and a middle distillate fraction. These fractions are the most valuable for transportation fuels and thus separating these fractions from less valuable fractions is favorable. In addition to a gasoline stream and a middle distillate stream, the fractions derived from the fractionation may comprise a gas stream and a distillation bottom. The fractionation may comprise any suitable distillation means, including distillation at ambient pressure or distillation or evaporation under reduced pressure.

The present disclosure further relates to a fuel component obtainable by the process of the present disclosure. The fuel component may be a transportation fuel component. The fuel component may be used as a fuel as it is or may be blended with other fuel components (renewable and/or petroleum fuel components) to provide a fuel.

The process of the present disclosure results in a specific composition of the cracking product due to the unique combination of waste plastic pyrolysis oil and biorenewable feedstock. That is, other than conventional cracking products, the present disclosure provides a fuel component having a specific chemical composition. In particular, the fuel component of the present disclosure differs from conventional fuel components in terms of boiling ranges, isoparaffin/n-paraffin content, aromatics content, olefin content, octane number, density, and/or sulfur content.

This disclosure further relates to a method of producing a fuel comprising producing a cracking product as defined above, optionally fractionating the cracking product to provide a cracking product fraction, and blending the cracking product or the cracking product fraction with another fuel component to provide a fuel. The method for producing a fuel may further comprise an optional purification of cracking product or of the fraction thereof.

EXAMPLES

The following illustrative examples are intended to be non-limiting.

Example

Catalytic testing was performed on the following feeds: vacuum gas oil (VGO), waste plastic pyrolysis oil (PPO), soybean oil (SBO), 50% VGO/50% PPO, 50% VGO/50% PPO, 50% VGO/50% SBO, and 50% SBO/50% PPO.

Catalytic cracking experiments were carried out in an Advanced Cracking Evaluation (ACE) Model C unit (Kayser Technology Inc). The reactor employed in the ACE unit was a fixed fluidized reactor with 1.6 cm ID. Nitrogen was used as fluidization gas and introduced from both bottom and top. The top fluidization gas was used to carry the feed injected from a calibrated syringe feed pump via a three-way valve.

The catalytic cracking of each feed was carried out at atmospheric pressure and temperature at 975° F. For each experiment, a constant amount of feed was injected at the rate of 1.2 g/min for 75 seconds. The catalyst/oil ratio was 6. After 75 seconds of feed injection, the catalyst was stripped off by nitrogen for a period of 525 seconds.

During the catalytic cracking and stripping process the liquid product was collected in a sample vial attached to a glass receiver, which was located at the end of the reactor exit and was maintained at −15° C. The gaseous products were collected in a closed stainless-steel vessel (12.6 L) prefilled with $N_2$ at 1 atm. Gaseous products were mixed by an electrical agitator rotating at 60 rpm as soon as feed injection was completed. After stripping, the gas products were further mixed for 10 mins to ensure homogeneity. The final gas products were analyzed using a refinery gas analyzer (RGA).

After the completion of stripping process, in-situ catalyst regeneration was carried out in the presence of air at 1300° F. The regeneration flue gas passed through a catalytic converter packed with CuO pellets (LECO Inc.) to oxidize CO to $CO_2$. The flue gas was then analyzed by an online infrared (IR) analyzer located downstream the catalytic converter. Coke deposited during cracking process was calculated from the $CO_2$ concentrations measured by the IR analyzer.

The results are summarized in Table 1.

TABLE 1

| | Feed | | | | | |
|---|---|---|---|---|---|---|
| | 100% VGO | 100% PPO | 50% VGO/ 50% PPO | 100% SBO | 50% VGO/ 50% SBO | 50% PPO/ 50% SBO |
| Conversion [wt. %] | 81.30 | 90.47 | 85.87 | 82.08 | 87.70 | 86.70 |
| Yields [wt. %] | | | | | | |
| Coke | 4.45 | 2.90 | 3.69 | 6.62 | 5.61 | 4.76 |
| Dry Gas | 2.05 | 1.40 | 1.72 | 2.52 | 2.24 | 2.01 |
| Hydrogen | 0.16 | 0.04 | 0.10 | 0.05 | 0.07 | 0.03 |
| LPG | 21.25 | 24.40 | 22.71 | 17.23 | 19.41 | 19.85 |
| Propylene | 5.53 | 6.75 | 6.08 | 5.97 | 5.81 | 5.81 |
| C4 Olefins | 5.77 | 8.16 | 6.90 | 5.01 | 5.44 | 5.80 |
| Gasoline (C5-430° F.) | 53.56 | 61.78 | 57.73 | 43.87 | 48.51 | 52.83 |
| Light Cycle Oil (430° F.-650° F.) | 12.89 | 8.03 | 10.47 | 13.35 | 13.10 | 9.89 |
| Heavy Cycle Oil (650° F.+) | 5.81 | 1.50 | 3.66 | 3.73 | 4.82 | 2.41 |
| Carbon Monoxide | 0.00 | 0.00 | 0.00 | 1.33 | 0.61 | 0.57 |
| Carbon Dioxide | 0.00 | 0.00 | 0.00 | 0.81 | 0.40 | 0.39 |
| Water | 0.00 | 0.00 | 0.00 | 10.54 | 5.30 | 4.83 |
| Gasoline Properties | | | | | | |
| n-Paraffins [wt. %] | 2.88 | 16.11 | 9.57 | 2.73 | 2.80 | 9.84 |
| Isoparaffins [wt. %] | 22.50 | 25.36 | 24.48 | 14.89 | 18.90 | 20.61 |
| Aromatics [wt. %] | 55.10 | 33.13 | 43.86 | 63.33 | 59.92 | 48.62 |
| Naphthenes [wt. %] | 7.67 | 8.33 | 7.94 | 6.85 | 7.22 | 7.15 |
| Olefins [wt. %] | 10.19 | 15.85 | 12.91 | 11.24 | 10.83 | 12.56 |
| RON | 94.56 | 70.61 | 83.46 | 99.25 | 97.21 | 87.55 |
| MON | 80.62 | 64.68 | 78.73 | 82.43 | 81.55 | 77.60 |
| (RON + MON)/2 | 87.59 | 67.65 | 81.09 | 90.84 | 89.38 | 82.58 |

There appears to be synergy in co-processing of plastics pyrolysis oil (PPO) with soybean oil (SBO). The hydrogen yields of 100% PPO and 100% SBO feeds were 0.04% and 0.05%, respectively, while co-processed 50% PPO/50% SBO feed had a hydrogen yield of 0.03%, lower than both of the pure feed cases. The propylene yield of the PPO/SBO co-feed (5.81%) was also lower than the 100% PPO and 100% SBO feeds (6.75% and 5.97%, respectively). The total C4 olefin yield of the PPO/SBO co-feed (5.80%) was lower than the numeral average of two 100% pure feed cases (average of 6.75% and 5.97% is 6.36%). Without being bound by theory, it is believed that there is hydrogen transfer between the PPO and SBO. Hydrogen transfer between these two feedstocks is highly desirable as it would improve product yield, selectivity and product properties.

Several benefits of co-processing of PPO with SBO were observed. While cracking of 100% PPO gave high conversion, the coke yield was low and may negatively impact FCC unit heat balance. High gasoline yield was achieved but with low octanes because the n-paraffins content was high. Cracking of 100% SBO gave good conversion and higher coke yield than PPO. Gasoline yield was lower due to the presence of feed oxygen but had high octanes because the aromatics content was high. In comparison to cracking 100% PPO, cracking of the PPO/SBO co-feed clearly reduced n-paraffins, increased aromatics and hence improved octanes for gasoline. Coke yield was also good and can satisfy most FCC unit heat balance requirements.

To quantitate the benefits of co-processing the PPO and SBO feeds, the results of cracking the 100% PPO feed, the 100% SBO feed, and their numerical average were compared with 50/50 PPO/SBO co-feeding case. The results are summarized in Table 2.

TABLE 2

| | 100% PPO | 100% SBO | Numerical Average [1] | 50% PPO/ 50% SBO | Deviation [2] |
|---|---|---|---|---|---|
| Conversion [wt. %] | 90.47 | 82.92 | 86.70 | 87.70 | 1% |
| Yields [wt. %] | | | | | |
| Coke | 2.90 | 6.62 | 4.76 | 4.76 | 0% |
| Dry Gas | 1.40 | 2.52 | 1.96 | 2.01 | 3% |
| Hydrogen | 0.04 | 0.05 | 0.05 | 0.03 | −33% |
| Methane | 0.46 | 0.78 | 0.62 | 0.67 | 8% |
| Ethane | 0.28 | 0.61 | 0.45 | 0.45 | 1% |
| Ethylene | 0.61 | 1.07 | 0.84 | 0.86 | 2% |
| LPG | 24.40 | 17.23 | 20.82 | 19.85 | −5% |
| Propane | 1.53 | 1.51 | 1.52 | 1.61 | 6% |
| Propylene | 6.75 | 5.97 | 6.36 | 5.81 | −9% |
| n-Butane | 1.34 | 1.01 | 1.18 | 1.27 | 8% |
| Isobutane | 6.61 | 3.72 | 5.17 | 5.36 | 4% |
| C4 Olefins | 8.16 | 5.01 | 6.59 | 5.80 | −12% |
| Gasoline (C5-430° F.) | 61.78 | 43.87 | 52.83 | 55.29 | 5% |
| Light Cycle Oil (430° F.-650° F.) | 8.03 | 13.35 | 10.69 | 9.89 | −7% |
| Heavy Cycle Oil (650° F.+) | 1.50 | 3.73 | 2.62 | 2.41 | −8% |
| Carbon Monoxide | 0.00 | 1.33 | 0.67 | 0.57 | −14% |
| Carbon Dioxide | 0.00 | 0.81 | 0.41 | 0.39 | −4% |
| Water | 0.00 | 10.54 | 5.27 | 4.83 | −8% |
| Gasoline Properties | | | | | |
| n-Paraffins [wt. %] | 16.11 | 2.73 | 9.42 | 9.84 | 4% |
| Isoparaffins [wt. %] | 25.36 | 14.89 | 20.13 | 20.61 | 2% |
| Aromatics [wt. %] | 33.13 | 63.33 | 48.23 | 48.62 | 1% |
| Naphthenes [wt. %] | 8.33 | 6.85 | 7.59 | 7.15 | −6% |
| Olefins [wt. %] | 15.85 | 11.24 | 13.55 | 12.56 | −7% |
| RON | 70.61 | 99.25 | 84.93 | 87.55 | 3% |
| MON | 64.68 | 82.43 | 73.56 | 77.60 | 5% |
| (RON + MON)/2 | 67.65 | 90.84 | 79.25 | 82.58 | 4% |

[1] The numerical average of 100% PPO feed and 100% SBO feed test results.
[2] The percent deviation of the numerical average of testing 100% PPO feed and 100% SBO compared to a few of 50/50 PPO/SBO.

The results in Table 2 show that co-processing increased the gasoline yield by 5% while reducing the LPG, light cycle oil and heavy cycle oil yields. The gasoline olefin content dropped by 7% and octane numbers increased by 3-5%, indicating gasoline properties were improved by co-processing. In addition, co-processing reduced loss of hydrocarbons to undesirable by-products such as carbon monoxide, carbon dioxide, and water by 14%, 4% and 8%, respectively. Due to the high concentration of oxygen in triglyceride oils, the loss of hydrocarbon through the carbon monoxide, carbon dioxide, and water formation has been an issue. These reductions suggest that by co-feeding waste plastics pyrolysis oil, renewable gasoline yield from the biorenewable feedstock can be increased.

The invention claimed is:

1. A process consisting of:
    introducing a pyrolysis oil derived from a waste plastic raw material to a fluidized-bed reactor;
    introducing a biorenewable feedstock comprising triglycerides to the fluidized-bed reactor; and
    co-processing the pyrolysis oil and the biorenewable feedstock in the fluidized-bed reactor in a presence of a cracking catalyst at catalytic cracking conditions to provide a cracking product.

2. The process of claim 1, wherein the waste plastics raw material comprises a post-consumer use polymer, a post-industrial use polymer, or a combination thereof.

3. The process of claim 1, wherein the waste plastics raw material is selected from high-density polyethylene, low-density polyethylene, polypropylene, or any combination thereof.

4. The process of claim 1, wherein the waste plastic raw material contains less than 1% by weight of a polymer selected from polyethylene terephthalate, polyvinyl chloride, polystyrene, a polymer of resin identification code number 7, and any combination thereof.

5. The process of claim 1, wherein the pyrolysis oil exhibits one or more of the following properties:
    (a) a C4 to C30 hydrocarbon content of at least 55 wt. %;
    (b) a paraffins content in a range of from 20 to 90 wt. %;
    (c) an API gravity at 15° C. of at least 28; and
    (d) a density at 15° C. of at least 0.6 g/cm$^3$.

6. The process of claim 1, wherein the biorenewable feedstock comprises at least 75 wt. % of triglycerides.

7. The process of claim 1, wherein the biorenewable feedstock comprises a plant oil, an animal oil, an algae oil, or a combination mixture thereof.

8. The process of claim 1, wherein the biorenewable feedstock comprises camelina oil, canola oil, corn oil, soy oil, rapeseed oil, soybean oil, colza oil, tall oil, sunflower oil, hempseed oil, olive oil, linseed oil, coconut oil, castor oil, peanut oil, palm oil, mustard oil, yellow and brown greases, tallow, lard, fish oil, algae oil, sewage sludge, or any combination thereof.

9. The process of claim 1, wherein a ratio of the pyrolysis oil to the biorenewable feedstock (pyrolysis oil:biorenewable feedstock) is selected to be in a range of at least one of: 5:1 to 1:19 by weight, 4:1 by weight or lower, 2:1 by weight or lower, 1:1 by weight or lower; 1:7 by weight or higher, 1:5 by weight or higher, 1:4 by weight or higher, and 1:3 by weight or higher.

10. The process of claim 1, wherein the pyrolysis oil and the biorenewable feedstock are introduced into the reactor via different feeding lines.

11. The process of claim 1, mixing wherein the pyrolysis oil and the biorenewable feedstock are mixed in advance to form a mixture in a mixing vessel and the mixture is introduced into the reactor.

12. The process of claim 1, wherein the cracking catalyst comprises at least one large-pore size faujasite zeolite or a mixture of at least one large-pore size faujasite zeolite and at least one medium-pore size zeolite selected from ZSM-5, ZSM-11, ZSM-22, ZSM-48, and MCM-22.

13. The process of claim 1, wherein the catalytic cracking conditions include a temperature of from 400° C. to 600° C. and a pressure of from 40 kPa to 725 kPa.

14. The process of claim 1, wherein the catalytic cracking process is conducted at a catalyst-to-oil ratio of from 2:1 to 10:1.

* * * * *